United States Patent
Chudy et al.

(10) Patent No.: US 9,515,879 B2
(45) Date of Patent: Dec. 6, 2016

(54) ESTABLISHING AN ACTION LIST FOR RECONFIGURATION OF A REMOTE HARDWARE SYSTEM

(71) Applicant: LENOVO ENTERPRISE SOLUTIONS (SINGAPORE) PTE. LTD., Singapore (SG)

(72) Inventors: David D. Chudy, Raleigh, NC (US); James G. McLean, Fuquay-Varina, NC (US); Cristian Medina, Durham, NC (US); Michael T. Shelton, Jr., Cary, NC (US)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 410 days.

(21) Appl. No.: 14/151,319

(22) Filed: Jan. 9, 2014

(65) Prior Publication Data

US 2015/0195135 A1  Jul. 9, 2015

(51) Int. Cl.
*G06F 3/048* (2013.01)
*H04L 12/24* (2006.01)
(Continued)

(52) U.S. Cl.
CPC ......... *H04L 41/0813* (2013.01); *G06F 3/0482* (2013.01); *H04L 41/22* (2013.01); *H04N 21/42204* (2013.01); *H04N 21/4424* (2013.01)

(58) Field of Classification Search
CPC ............ G06F 3/00; G06F 3/14; G06F 3/048; G06F 3/0481; G06F 3/0482; G06F 9/44; G06F 9/445; G06F 9/4443; G06F 15/16; H04N 5/78; G09B 19/00; G09B 19/18; G06Q 30/00; G06Q 30/02; H04L 12/24; H04L 41/0813; H04L 41/22
See application file for complete search history.

(56) References Cited

U.S. PATENT DOCUMENTS 5,499,146 A   3/1996   Donahue et al.
6,457,975 B1  10/2002  Miranda et al.
(Continued)

FOREIGN PATENT DOCUMENTS

CN  101866462 A  10/2010
CN  102136204 A   7/2011
(Continued)

OTHER PUBLICATIONS

Chessa, M., et al., "Virtual Reality to Simulate Visual Tasks for Robotic Systems", Virtual Reality, Chapter 4, 23 Pages, InTech, Published Online Dec. 8, 2013, URL: <a href="http://www.intechopen.com/books/virtual-reality/virtual-reality-to-simulate-visual-tasks-for-robotic-systems" title="Virtual Reality to Simulate Visual Tasks for Robotic Systems">Virtual Reality to Simulate Visual Tasks for Robotic Systems</a>.

*Primary Examiner* — Xiomar L Bautista
(74) *Attorney, Agent, or Firm* — Brandon C. Kennedy; Katherine S. Brown; Kennedy Lenart Spraggins LLP (57) ABSTRACT

Establishing an action list for reconfiguration of a remote hardware system includes: receiving, by an action list generator via a graphical user interface ('GUI') presenting a graphical representation of the remote hardware system, a command to record subsequent actions; while recording: receiving, by the action list generator via the GUI, a series of user operations; identifying, for each user operation in the series, an action associated with the user operation; recording, by the action list generator, each identified action in an action list ordered in accordance with the series of user operations; and receiving a command to cease recording of subsequent actions.

16 Claims, 4 Drawing Sheets

(51) Int. Cl.
  *G06F 3/0482* (2013.01)
  *H04N 21/422* (2011.01)
  *H04N 21/442* (2011.01)

(56) References Cited

U.S. PATENT DOCUMENTS

| | | | | |
|---|---|---|---|---|
| 6,810,406 | B2 * | 10/2004 | Schlabach | B61L 27/0094 |
| 8,074,214 | B2 | 12/2011 | Isaacson et al. | |
| 2002/0007225 | A1 * | 1/2002 | Costello | B61K 13/00 |
| | | | | 700/99 |
| 2002/0087578 | A1 * | 7/2002 | Vroman | B61L 27/0094 |
| 2006/0015289 | A1 * | 1/2006 | Shakman | G01G 19/414 |
| | | | | 702/173 |
| 2006/0153496 | A1 * | 7/2006 | Tanobe | H04J 14/0227 |
| | | | | 385/24 |
| 2009/0286484 | A1 * | 11/2009 | Phung | H04L 12/24 |
| | | | | 455/67.11 |
| 2010/0325206 | A1 | 12/2010 | Dayal et al. | |
| 2012/0107175 | A1 * | 5/2012 | Satyamurthy | B01J 19/004 |
| | | | | 422/68.1 |
| 2012/0123835 | A1 | 5/2012 | Chu | |
| 2012/0290936 | A1 | 11/2012 | Mahmud | |
| 2012/0308966 | A1 | 12/2012 | Davis | |

FOREIGN PATENT DOCUMENTS

| | | |
|---|---|---|
| EP | 1 065 603 A2 | 1/2001 |
| WO | WO 2007/135585 A1 | 11/2007 |

* cited by examiner

ESTABLISHING AN ACTION LIST FOR RECONFIGURATION OF A REMOTE HARDWARE SYSTEM

BACKGROUND OF THE INVENTION

Field of the Invention

The field of the invention is data processing, or, more specifically, methods, apparatus, and products for establishing an action list for reconfiguration of hardware components in a remote location.

Description of Related Art

A remote laboratory (also known as online laboratory, remote workbench) provides a customer the use of telecommunications to remotely conduct real (as opposed to virtual) experiments, at the physical location of the operating technology, while the customer utilizing technology from a separate geographical location. From time to time in such remote labs, components physically present at the lab but utilized remotely by the customer must be reconfigured or repaired. Depending on the hardware or services, the reconfiguration may need to occur in a particular order. Often times, the customer is aware of that order while the technicians physically present at the remote lab site are not. Providing such ordered steps along with explanation for the reconfiguration manually is inefficient, tedious, and prone to errors.

Similarly, a remote data center is a collection of computing hardware and software that can be accessed from a remote location to initiate, monitor, and control useful computing operations. From time to time in such remote data centers, it is desired to physically reconfigure or otherwise physically alter the state of the hardware in the data center. This may be to facilitate addition or alteration of optional hardware features, change network connections, perform hardware upgrades, or effect repair of hardware. These tasks may require several steps that must be performed in a particular order. The datacenter technicians physically present at the datacenter may not be aware of the specific process required. Again, providing such ordered steps along with explanation for the reconfiguration manually is inefficient, tedious, and prone to errors.

SUMMARY OF THE INVENTION

Methods, apparatus, and products of establishing an action list for reconfiguration of a remote hardware system are disclosed in this specification. Establishing such an action list includes: receiving, by an action list generator via a graphical user interface ('GUI') presenting a graphical representation of the remote hardware system, a command to record subsequent actions; while recording: receiving, by the action list generator via the GUI, a series of user operations; identifying, for each user operation in the series, an action associated with the user operation; recording, by the action list generator, each identified action in an action list ordered in accordance with the series of user operations; and receiving a command to cease recording of subsequent actions.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
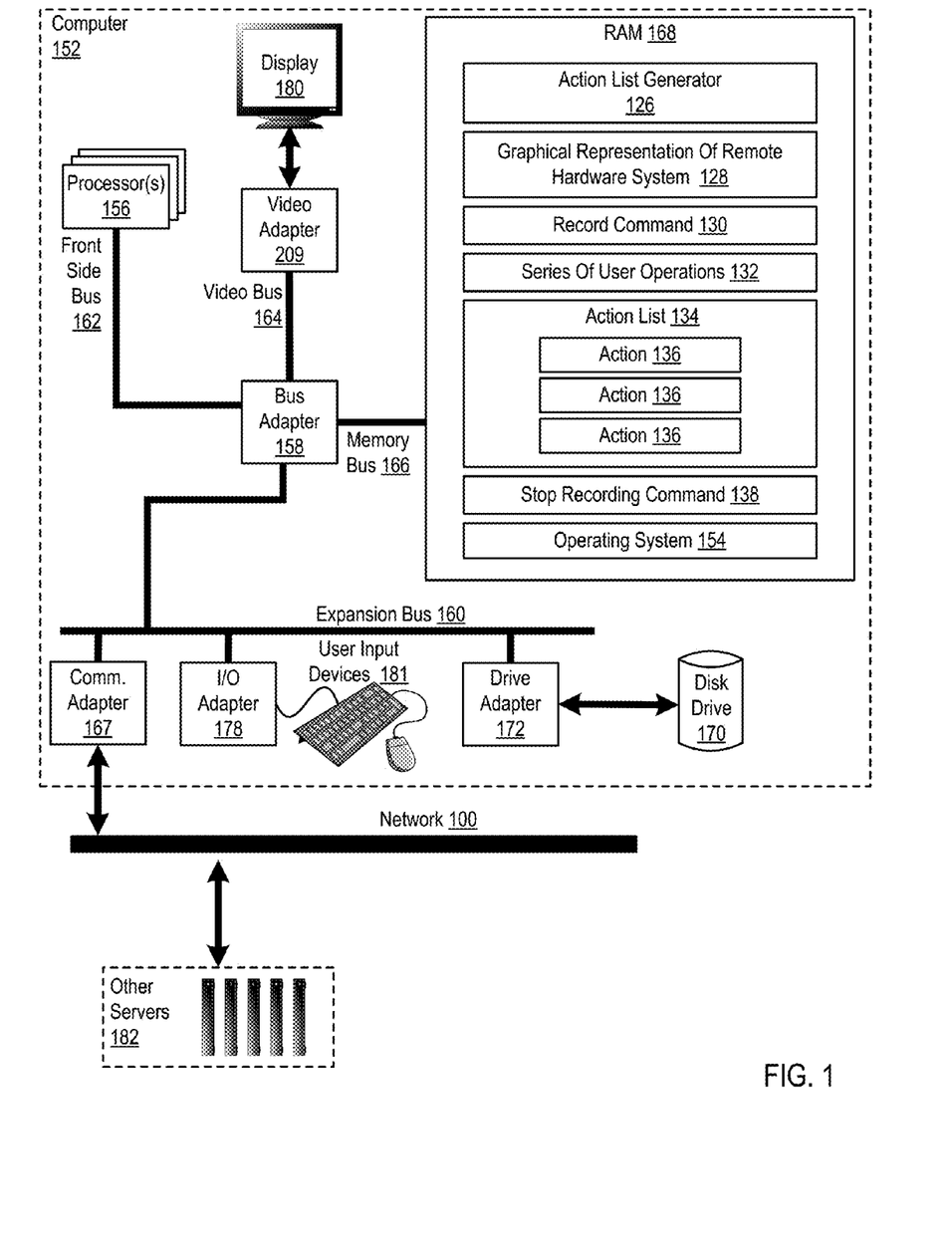
FIG. 1 sets forth a network diagram of a system for establishing an action list for reconfiguration of a remote hardware system according to embodiments of the present invention.

Exemplary methods, apparatus, and products for establishing an action list for reconfiguration of a remote hardware system in accordance with the present invention are described with reference to the accompanying drawings, beginning with FIG. 1. FIG. 1 sets forth a network diagram of a system for establishing an action list for reconfiguration of a remote hardware system according to embodiments of the present invention. The system of FIG. 1 includes an example of automated computing machinery in the form of a computer (152) useful in establishing an action list for reconfiguration of a remote hardware system according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an action list generator (126), a module of computer program instructions that, when executed, causes the computer (152) to establish an action list for reconfiguration of a remote hardware system according to embodiments of the present invention. The term 'action list' as used in this specification refers to a set of ordered steps, a sequence, of actions to be carried out by remote lab personnel to effect a reconfiguration or repair of a user's lab set up or system.

The action list generator (126) in the example of FIG. 1 may establish such an action list by receiving, via a graphical user interface ('GUI') (128) presenting a graphical representation of the remote hardware system, a command to record subsequent actions (130). Then, while recording, the action list generator (126) may receive, via the GUI, a series of user operations. The series of user operations occurs in a particular order and the action list generator (126) tracks that order. A 'user operation' refers to an interaction with the GUI. Examples of such user interactions may include mouse clicks, keyboard keystrokes, manipulations via a user input device of a three dimensional representation of a component of the lab system within the GUI, gestures input through a touch-screen interface, and the like.

The action list generator (126) may then identify, for each user operation in the series, an action (136) associated with the user operation. The action list generator (126) may be programmed to identify such actions or lookup the actions in a data structure specifying actions associated with user operations.

The action list generator (126) in the example of FIG. 1 may also record each identified action (136) in an action list (134) ordered in accordance with the series of user operations. Such an action list (134) may be implemented in a variety of ways including, for example, as a data structure. In one example, the action list (134) may be implemented as an eXtensible Markup Language (XML) document. In another example, the action list (134) may be implemented in the form of an ordered list of text instructions.

The action list generator (126) may then receive a command (138) to cease recording of subsequent actions. That is, after a user has completed the series of user operations, the user may command the action list generator to cease recording the actions.

Also stored in RAM (168) is an operating system (154). Operating systems useful in computers configured for establishing an action list for reconfiguration of a remote hardware system according to embodiments of the present invention include UNIX™ Linux™ Microsoft XP™ AIX™ IBM's i5/OS™ and others as will occur to those of skill in the art. The operating system (154) and the action list generator (126) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for establishing an action list for reconfiguration of a remote hardware system according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for establishing an action list for reconfiguration of a remote hardware system according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
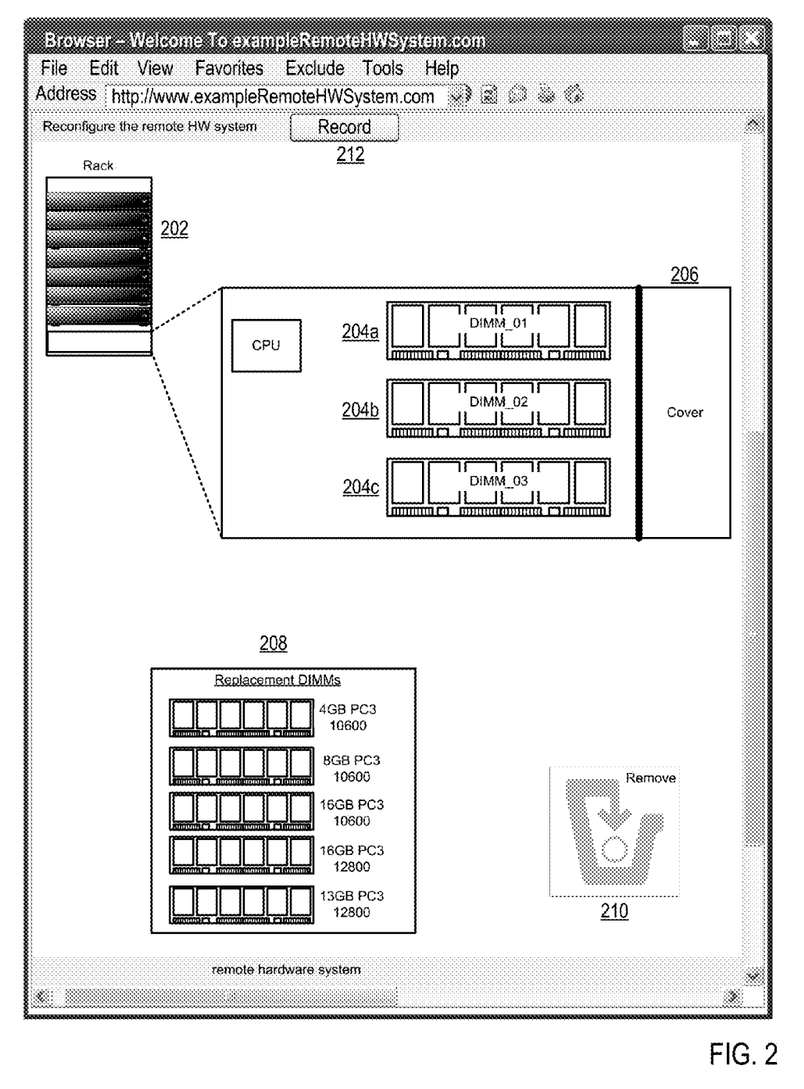
FIG. 2 sets forth an example GUI configured for establishing an action list for reconfiguration of a remote hardware system.

For further explanation, FIG. 2 sets forth an example GUI configured for establishing an action list for reconfiguration of a remote hardware system. The example GUI of FIG. 2 includes a graphical representation of a remote hardware system that includes a rack (202) of servers.

The user, in the example of FIG. 2, has provided a command to the action list generator to record subsequent actions through use of the 'Record' GUI button (212). Then, through use of one or more user input devices, a user, has performed a series of user operations on the virtual representations of the remote hardware system. First, the user removed one particular server from the rack (202). Next, the user opened the particular the server's cover (206). These actions occur in the GUI representation of the remote hardware rather than on the remote hardware itself.

The particular server includes three Dual In Line Memory Modules (204*a*, 204*b*, 204*c*). The user may perform actions to remove one DIMM from the virtual representation of the particular server in various ways facilitated by the GUI including, for example, by dragging the DIMM to the 'Remove' GUI item (210) or by right-clicking on a mouse and selecting, from a drop down selection list, an option to remove the DIMM.

Then, the user may continue to use the GUI to interact with the virtual representation of the remote hardware to replace the removed DIMM from the virtual representation of the particular server with another DIMM from the set of available replacement DIMMs (208) in various ways facilitated by the GUI, for example by dragging the DIMM from the set of replacement DIMMs to the empty slot created when the previous DIMM was removed.

Finally, the user may continue to use the GUI to interact with the virtual representation of the remote hardware to close the cover of the particular server (206) by, for example, dragging the cover over the server via a mouse or other user input device, and replace the server into the server's slot in the rack (202) by dragging via a mouse or the like.

The particular mechanisms described here for interacting with a virtual representation of hardware via a GUI are for example rather than limitation. Other mechanisms for interacting with virtual objects in GUIs will occur to those familiar with such interfaces and are also included. Additionally, the specific examples of hardware types represented in the system are for example rather than limitation. The disclosed approach can be applied on any type of remote hardware, including but not limited to datacenter racks, chassis, servers, switches, cables, option cards, CPUs, memory components, mass storage devices, heatsinks, fans, baffles, HVAC equipment, engines or engine components, laboratory apparatus, mechanical components, physical controls on devices such as dials or switches, locks, and the like.

Then, the user may invoke the "Record" GUI button (202) again to command the action list generator to cease recording subsequent actions. For each of the user operations—interaction with the GUI environment representing removing the server, opening the cover, interaction with the GUI environment representing removing one DIMM, interaction with the GUI environment representing inserting another DIMM, interaction with the GUI environment representing replacing the cover on the server, and interaction with the GUI environment representing replacing the serving into the slot rack—the action list generator identifies an action associated with the user operation. Then, the action list generator records each identified action, in the order the actions occurred in the GUI environment, in an action list.

Although the GUI in the example of FIG. 2 depicts two-dimensional objects for clarity of explanation, readers of skill in the art will recognize that some or all of the lab system may be depicted in a three-dimensional representation. In such a virtual world representation, the manipulation of objects may more directly reflect the actions required for the reconfiguration.

Figure 3:
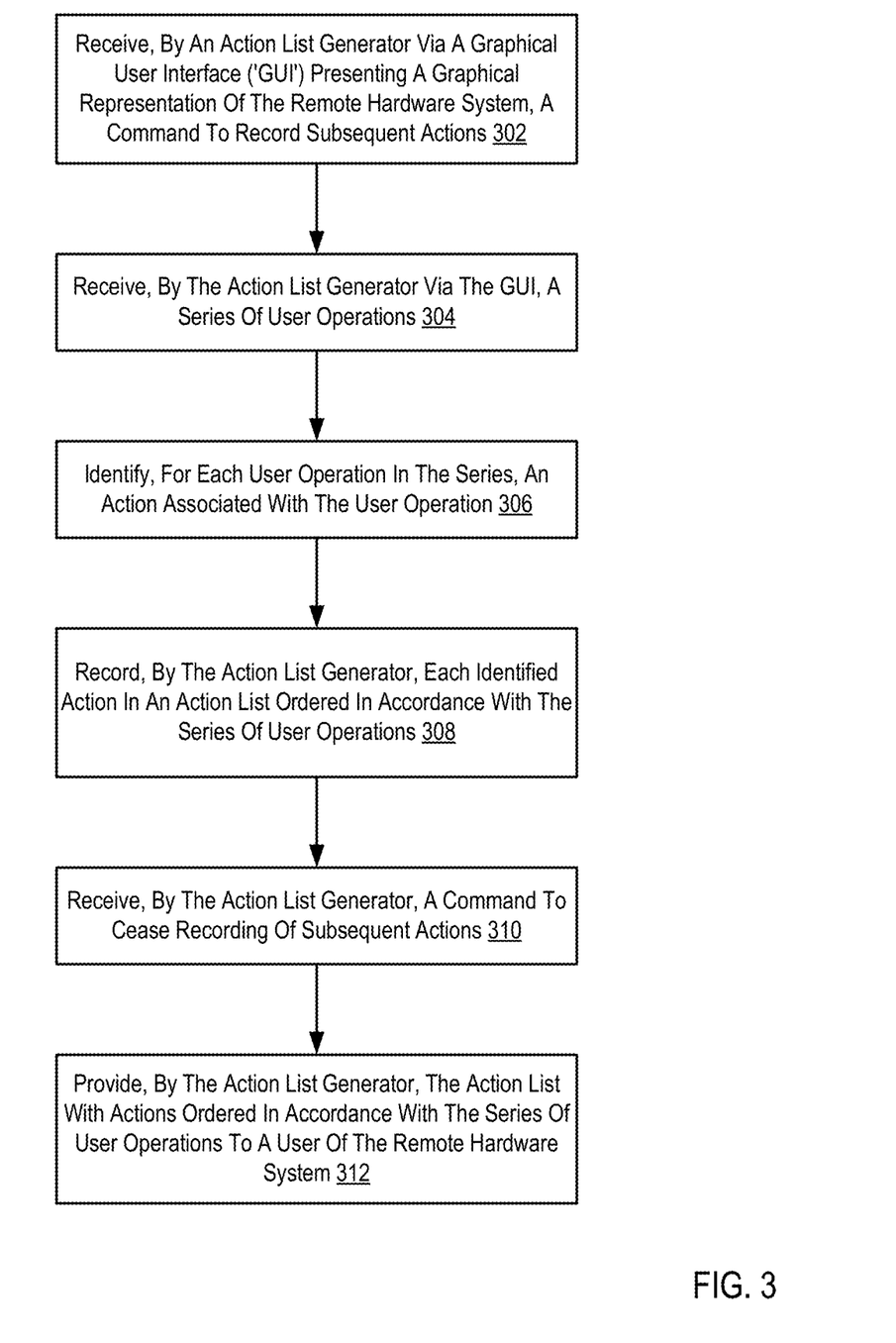
FIG. 3 sets forth a flow chart illustrating an exemplary method for establishing an action list for reconfiguration of a remote hardware system according to embodiments of the present invention.

For further explanation, FIG. 3 sets forth a flow chart illustrating an exemplary method for establishing an action list for reconfiguration of a remote hardware system according to embodiments of the present invention. The method of FIG. 3 includes receiving (302), by an action list generator via a GUI presenting a graphical representation of the remote hardware system, a command to record subsequent actions. Receiving (302) a command to record subsequent actions may be carried out in various ways including, for example, by receiving a user's invocation of a GUI object (such as a GUI button) designated for such purpose.

Then, while recording, the method of FIG. 3 continues by receiving (304), by the action list generator via the GUI, a series of user operations. Receiving a series of user operations may be carried out in various ways including, receiving mouse clicks, dragging of GUI objects via a mouse, receiving user selections from GUI selection lists, receiving spoken commands, receiving command line commands, receiving gestures on a touch-screen user interface device, and so on.

The method of FIG. 3 also includes identifying (308), for each user operation in the series, an action associated with the user operation. Identifying (308), for each user operation in the series, an action associated with the user operation may be carried out in various ways including, for example, by identifying an object in the graphical representation of the lab system with which a user interacts, the type of interaction, and determining, from a data structure association interactions with actions, an action associated with the type of interaction. The action list generator may also receive a selection of an action directly via the GUI through a user's selection of a drop down selection list option. Examples of such options include an option to "Remove object," an option to "Replace object with . . . ," or the like.

The method of FIG. 3 also includes recording (308), by the action list generator, each identified action in an action list ordered in accordance with the series of user operations. Recording (308) each identified action in an action list ordered in accordance with the series of user operations may be carried out by recording the actions in a structured document, a list, a table, or other data structure.

The method of FIG. 3 also includes receiving (310), by the action list generator, a command to cease recording of subsequent actions. Receiving (310) a command to cease recording of subsequent actions may be carried out in a manner similar to receiving (302) a command to begin recording actions.

The method of FIG. 3 also includes providing (312), by the action list generator, the action list with actions ordered in accordance with the series of user operations to a user of the remote hardware system. Providing (312) the action list to a user of the remote hardware system (that is, personnel physically present at the remote lab), may be carried out automatically as a response to ceasing the recording or at the behest of the user causing the action list to be established. Providing (312) the action list may be carried out via email, by storing the list in a database designated for such purpose, or in other ways as will occur to readers of skill in the art. Once received, the remote hardware system personnel may carry out the reconfiguration of the remote hardware system in accordance with the action list, in the order specified therein.

Figure 4:
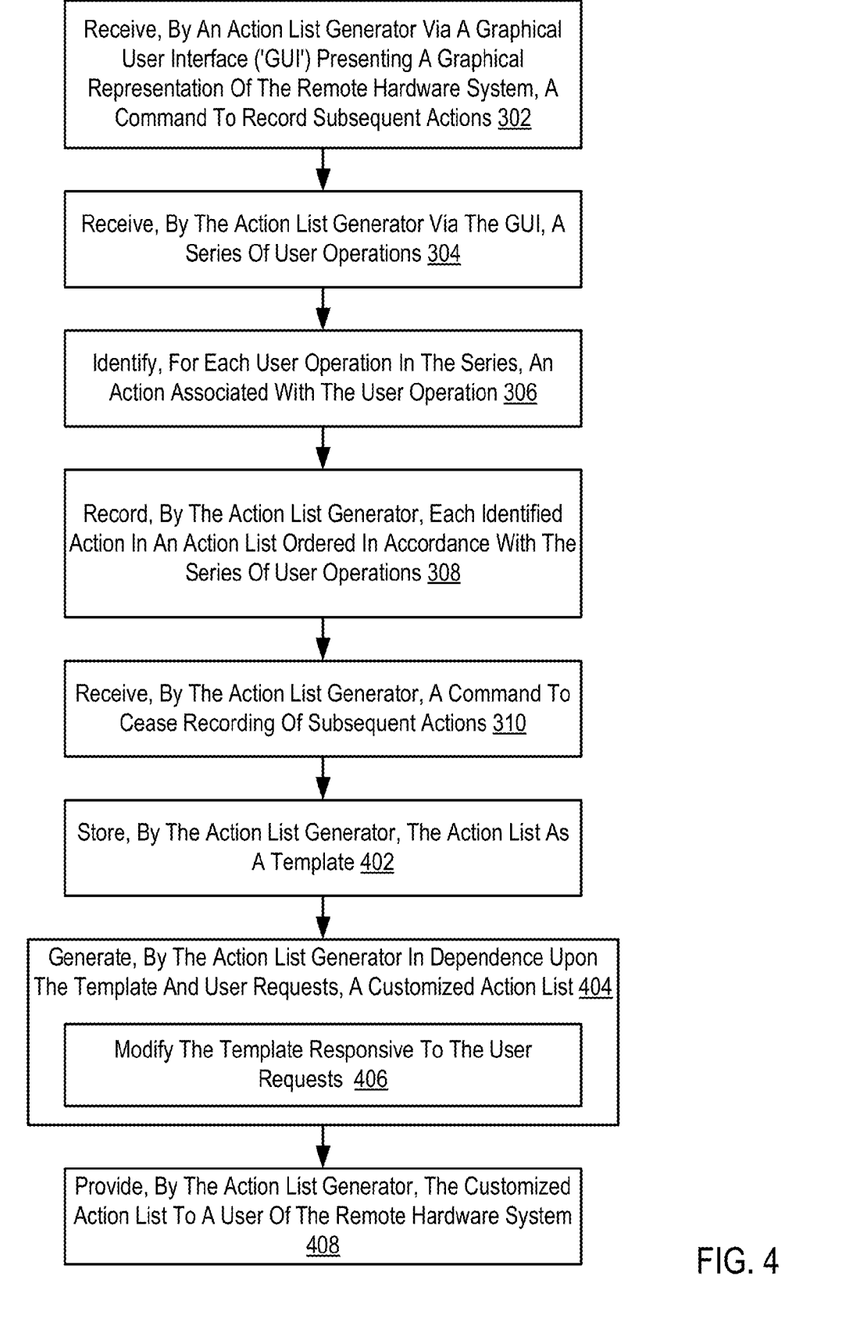
FIG. 4 sets forth a flow chart illustrating another exemplary method for establishing an action list for reconfiguration of a remote hardware system according to embodiments of the present invention.

For further explanation, FIG. 4 sets forth a flow chart illustrating a further exemplary method for establishing an action list for reconfiguration of a remote hardware system according to embodiments of the present invention. The method of FIG. 4 is similar to the method of FIG. 3 in that the method of FIG. 4 includes receiving (302) a command to record subsequent actions; receiving (304) a series of user operations; identifying (306) an action associated with the user operation; recording (308) each identified action in an action list ordered in accordance with the series of user operations; receiving (310) a command to cease recording of subsequent actions.

The method of FIG. 4 differs from the method of FIG. 3, however, in that the method of FIG. 4 also includes storing (402), by the action list generator, the action list as a template. Storing (402) the action list as a template may be carried out by storing the action list without identification of particular component characteristics. The action list generator may maintain a repository of action lists for various types of relatively common reconfigurations. For example, replacing a DIMM in a server with a higher capacity DIMM may be a relatively common reconfiguration. As such, it may be useful to store a template that accurately represents the actions to be carried out with a server and a DIMM, without specifying the actual server, the actual DIMM to be replaced, or the characteristics of the replacement DIMM. Instead, as described below a user may access the template, modify the template to provide the specifics of the server, the DIMM to be replaced, and the characteristics of the replacement DIMM and provide the modified template to the remote hardware system personnel.

To that end, the method of FIG. 4 also includes generating (404), by the action list generator in dependence upon the template and user requests, a customized action list. In the method of FIG. 4, generating (404) a customized action list is carried out by modifying (406) the template responsive to the user requests. The method of FIG. 4 also includes providing (408), by the action list generator, the customized action list to a user of the remote hardware system. In this way, a common type of reconfiguration may be stored as a template, accessed by a user at a later time, and modified with specific information regarding the system all without having to establish a new action list each time the same type of reconfiguration is to be carried out.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of establishing an action list for reconfiguration of a remote hardware system, the method comprising:
   receiving, by an action list generator via a graphical user interface ('GUI') presenting a graphical representation of the remote hardware system, a command to record subsequent actions;
   while recording:
   receiving, by the action list generator via the GUI, a series of user operations;

identifying, for each user operation in the series, an action associated with the user operation;

recording, by the action list generator, each identified action in an action list ordered in accordance with the series of user operations, wherein the action list represents a procedure to reconfigure the remote hardware system; and receiving, by the action list generator, a command to cease recording of subsequent actions.

2. The method of claim 1, further comprising:

providing, by the action list generator, the action list with actions ordered in accordance with the series of user operations to a user of the remote hardware system.

3. The method of claim 1, further comprising:

storing, by the action list generator, the action list as a template;

generating, by the action list generator in dependence upon the template and user requests, a customized action list including, modifying the template responsive to the user requests; and providing, by the action list generator, the customized action list to a user of the remote hardware system.

4. The method of claim 1 wherein the GUI includes a three dimensional representation of remote hardware system.

5. The method of claim 4 wherein at least one user operation comprises an interaction, via the GUI, with a three dimensional representation of a component of the remote hardware system.

6. The method of claim 4 wherein at least one user operation comprises an interaction, via the GUI, with a three dimensional representation of a component of the remote hardware system.

7. An apparatus for establishing an action list for reconfiguration of a remote hardware system, the apparatus comprising a computer processor, a computer memory operatively coupled to the computer processor, the computer memory having disposed within it computer program instructions that, when executed by the computer processor, cause the apparatus to carry out the steps of:

receiving, by an action list generator via a graphical user interface ('GUI') presenting a graphical representation of the remote hardware system, a command to record subsequent actions;

while recording:

receiving, by the action list generator via the GUI, a series of user operations;

identifying, for each user operation in the series, an action associated with the user operation;

recording, by the action list generator, each identified action in an action list ordered in accordance with the series of user operations, wherein the action list represents a procedure to reconfigure the remote hardware system; and receiving, by the action list generator, a command to cease recording of subsequent actions.

8. The apparatus of claim 7, further comprising computer program instructions that, when executed by the computer processor, cause the apparatus to carry out the step of:

providing, by the action list generator, the action list with actions ordered in accordance with the series of user operations to a user of the remote hardware system.

9. The apparatus of claim 7, further comprising computer program instructions that, when executed by the computer processor, cause the apparatus to carry out the steps of:

storing, by the action list generator, the action list as a template;

generating, by the action list generator in dependence upon the template and user requests, a customized action list including, modifying the template responsive to the user requests; and providing, by the action list generator, the customized action list to a user of the remote hardware system.

10. The apparatus of claim 7 wherein the GUI includes a three dimensional representation of remote hardware system.

11. The apparatus of claim 10 wherein at least one user operation comprises an interaction, via the GUI, with a three dimensional representation of a component of the remote hardware system.

12. A computer program product for establishing, an action list for reconfiguration of a remote hardware system, the computer program product disposed upon a non-transitory computer readable storage medium, the computer program product comprising computer program instructions that, when executed, cause a computer to carry out the steps of:

receiving, by an action list generator via a graphical user interface ('GUI') presenting a graphical representation of the remote hardware system, a command to record subsequent actions;

while recording:

receiving, by the action list generator via the GUI, a series of user operations;

identifying, for each user operation in the series, an action associated with the user operation;

recording, by the action list generator, each identified action in an action list ordered in accordance with the series of user operations, wherein the action list represents a procedure to reconfigure the remote hardware system; and receiving, by the action list generator, a command to cease recording of subsequent actions.

13. The computer program product of claim 12, further comprising computer program instructions that, when executed, cause a computer to carry out the step of:

providing, by the action list generator, the action list with actions ordered in accordance with the series of user operations to a user of the remote hardware system.

14. The computer program product of claim 12, further comprising computer program instructions that, when executed, cause a computer to carry out the steps of:

storing, by the action list generator, the action list as a template;

generating, by the action list generator in dependence upon the template and user requests, a customized action list including, modifying the template responsive to the user requests; and providing, by the action list generator, the customized action list to a user of the remote hardware system.

15. The computer program product of claim 12 wherein the GUI includes a three dimensional representation of remote hardware system.

16. The computer program product of claim 12 wherein the computer readable medium comprises a storage medium.

* * * * *